US patent 2,729,856 — Patented Jan. 10, 1956

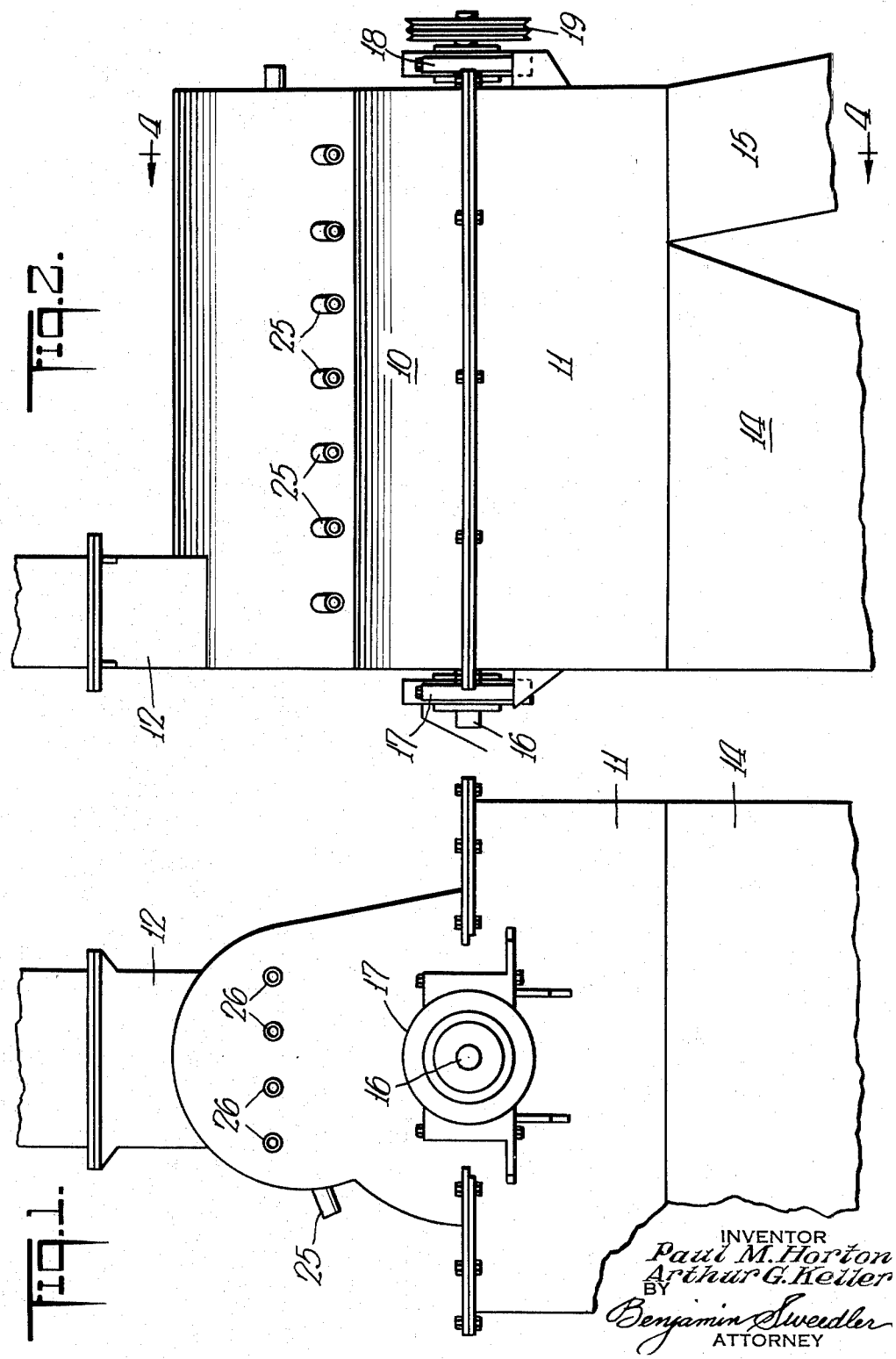

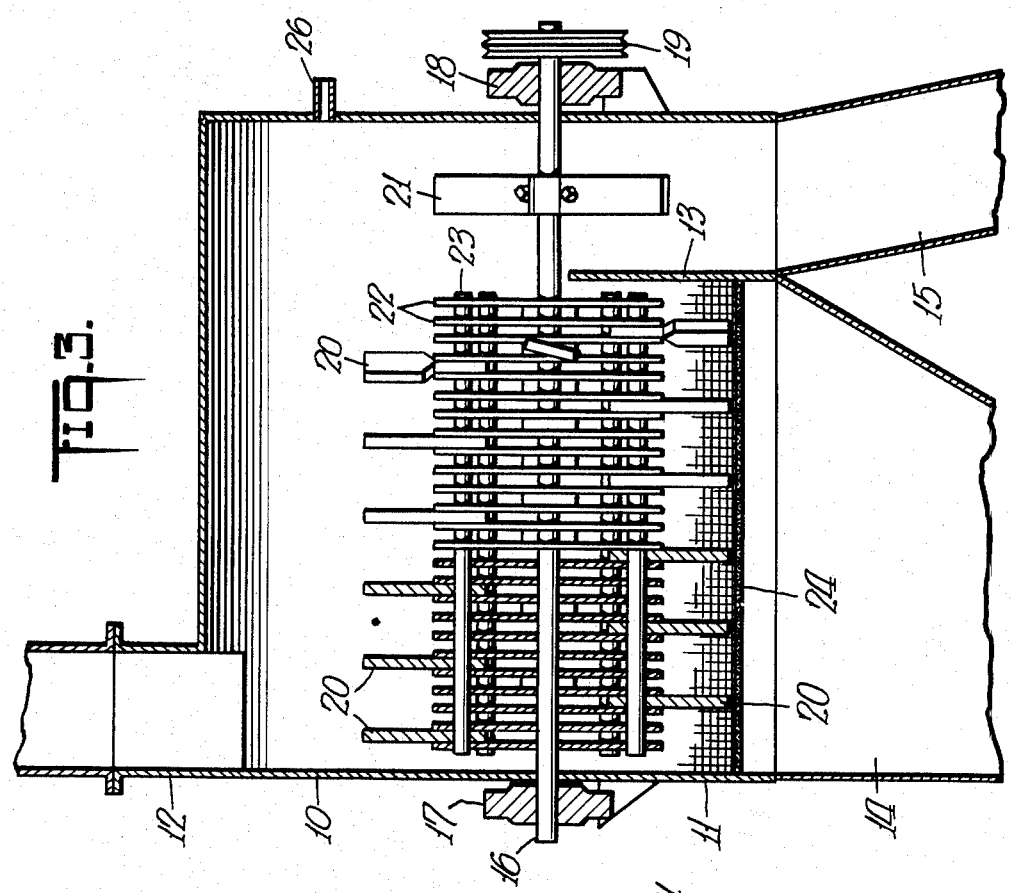
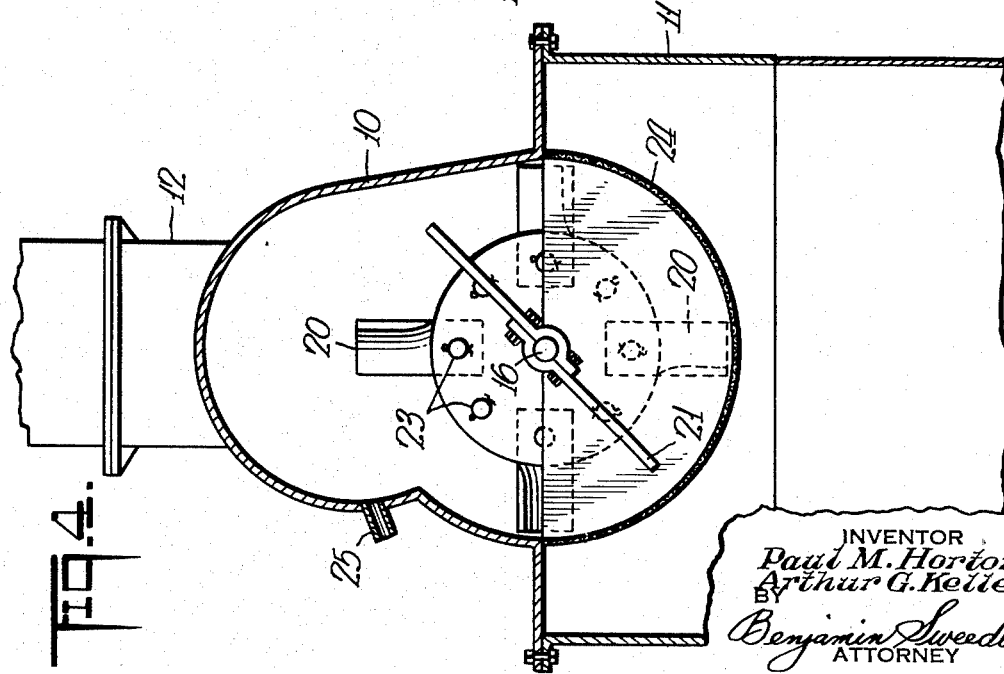

2,729,856

PROCESS FOR SEPARATING FIBROUS VEGETABLE MATERIALS INTO PITH AND FIBER PORTIONS

Paul M. Horton and Arthur G. Keller, Baton Rouge, La., assignors to Board of Supervisors of Louisiana State University and Agricultural and Mechanical College, Baton Rouge, La.

Original application July 6, 1949, Serial No. 103,268. Divided and this application May 28, 1954, Serial No. 433,195

5 Claims. (Cl. 19—7)

This invention relates to the processing of fibrous vegetable materials so as to separate them into two portions, one of which is substantially pith-free fiber and the other of which contains a major portion of the original pith. The fibrous vegetable materials which may be treated include sugar cane bagasse, sorgho bagasse, bamboo, reed canes, maize stalks, and similar products or by-products.

The fibers of such materials are suitable for the production of pulp for use in paper or alpha-cellulose production, or other purposes, but their commercial use in such fields has been handicapped by the presence of varying amounts of pith and other non-fibrous material which is intimately admixed with the fibers, and which has little or no value in such pulps. Its separation from the fibers by presently known methods is too costly to be practical.

This application is a division of application Serial No. 103,268, filed July 6, 1949.

One of the objects of the present invention is to provide a process for the treatment of fibrous vegetable materials containing pith to simply, continuously and economically separate such materials into pith and fiber portions.

Another object of our invention is to produce from fibrous vegetable materials of the type above referred to a substantially pith-free fiber fraction suitable for use in the preparation of cellulose pulps.

Another object of our invention is to produce from fibrous vegetable materials of the type referred to a fraction containing the major portion of the original pith suitable for use in animal feeds, in animal litter, in agricultural mulches, as an absorbent in explosives manufacture, and for other purposes.

Other objects and advantages of our invention will become apparent in connection with the following description and a consideration of the construction shown in the accompanying drawings, which is merely one of many embodiments of our invention. In these drawings:

Figure 1 is an end view of an apparatus embodying our invention.

Figure 2 is a side elevation.

Figure 3 is a vertical central longitudinal section, and

Figure 4 is a vertical transverse section on the line 4—4 of Figure 2.

In the apparatus illustrated for practicing the process of this invention, there is provided a casing which may include an upper section 10 and a lower section 11 which may be detachably secured together. The fibrous material to be treated is delivered through an intake pipe or chute 12 at the top and at one end of the upper casing section 10. In the lower casing section there is provided a vertical transverse partition 13 below and upon opposite sides of which are the separate outlets 14 and 15 for the pith and the fiber respectively.

Within the casing, and preferably journaled at the dividing line between the upper and lower sections of the casing, there is mounted a rotor including a longitudinally extending horizontal shaft 16 supported in bearings 17 and 18, and driven in any suitable manner, as for instance by a pulley 19. The rotor also includes a plurality of hammers 20 which are at one side of the partition 13, below the inlet 12 and above the outlet 14, and a beater 21 which is at the other side of the partition 13 and above the outlet 15. The hammers 20 may be secured to the shaft in various different ways. As illustrated, the shaft 16 carries a plurality of circular plates 22 spaced apart axially, and the hammers are interspaced between said plates and held in place by bolts 23 which connect the plates together. The hammers project outwardly beyond the periphery of the plates, and preferably are arranged in a generally spiral path. In other words, with the shaft at rest, each fourth hammer may extend up vertically, the next successive hammers of a series of four would extend horizontally in one direction, the next successive hammers would extend downwardly, and the last hammer of each series would extend horizontally in the other direction. A suitable number of hammers, for instance the last four nearest to the partition 13, may have their outer ends twisted somewhat toward a helical position in respect to the axis of the shaft, so as to act as screw blades or pushers to advance the material above the partition 13 toward the beater 21, whereby it may pass down and out through the discharge outlet 15.

Beneath the hammers there is provided a substantially semi-cylindrical screen 24 coaxial with the shaft 16 and disposed slightly beyond the path of movement of the outer ends of the hammers. Above the hammers the casing preferably has a portion of the upper section 10 at one or both sides of the shaft bent inwardly, thus to impart to the casing an approximately figure 8 configuration, with the top wall spaced a substantial distance above the path of the hammers. The uppr casing section 10, at some distance above the shaft, and preferably approximately at the elevation of the upper side of the path of movement of the hammers, has a plurality of upwardly inclined nozzles 25, and the end wall has a plurality of nozzles 26. All of these nozzles are connected to a source of water supply, whereby jets of water may be projected into the mass of fibrous material above the hammers.

In the operation of the apparatus the fibrous vegetable material is delivered at a suitable rate through the inlet 12 adjacent to one end of the casing, and into this material are projected the jets of water from the nozzles 25 and 26. The shaft may be driven at a relatively high speed, so that the outer ends of the hammers may travel at, for instance, approximately 9,000 feet per minute. The shaft with its hammers and beater is preferably rotated counterclockwise when viewed as in Figure 4, and the hammers rapidly strike the mass of material into which the water jets are projected, and drag the material around the periphery and along the screen, and project it back up into the mass above the hammers. Due to the inclination of at least some of the hammers, the material is progressively advanced along the chamber from the intake to a position above the partition 13 and the beater 21, and the latter acts to pull the fibers apart and project them down through the outlet 15.

The water which is delivered to the material above the beaters drains down through the disintegrated material and carries with it all or a very substantial part of the pith which is liberated from the fibers by the hammers. Thus, substantially all of the pith will be carried through the screen 24 with the water and out through the outlet 14. The screen is of such mesh that the small particles of pith can readily pass therethrough, whereas the fibers are swept along the screen and eventually delivered beyond the ends of the hammers and into the path of the beater 21.

The action of the machine is to hackle and hammer the material being treated, rather than to rub or grind the fibers free of pith, and the hammers serve to free the fibers from each other, rather than to break them up, and to carry the fibers around and deliver them into the path of streams of water after each revolution. Thus it is possible to obtain the maximum separation with the minimum of power requirements.

Although the hammers may be tightly secured to the plates so that they extend outwardly in a radial direction, it is obvious that they may be rather loosely mounted on the bolts 23, so that the latter act as pivotal supports, and the hammers may swing on the bolts, but tend to assume radial positions due to centrifugal force. The space above the hammers permits the material thrown up by the hammers to become intermixed with the fresh fibrous material being admitted through the inlet 12, and permits such fibers to be washed by the jets of water after each passage around the axis of the shaft 16.

By means of our invention it is possible to remove substantially all of the pith from the fibers, and separate individual fibers without substantial breakage or cutting of them, and therefore the fibrous material discharged through the outlet 15 is suitable for making wall board and other such products having substantial mechanical strength. The progressive movement of the fibers across the body of the beater permits the pith and water to go to the bottom where they are discharged through the screen, and the substantially pith-free fibers are discharged from the end opposite to the inlet for the material to be treated.

Thus, it will be noted, our invention provides a method of separating crushed stalks containing pith and fibrous material, such, for example, as bagasse, into pith and constituents. The method involves establishing a rotating beating zone constituted of the rotating hammers 20 above and over the screen 24, which zone is of substantial depth due to the shape of the upper casing section 10, which, it will be noted, is spaced a substantial distance above the top of the periphery of the cylinder defining the circular path through which the hammers move. Hence, this beating zone accommodates a thick mass of the crushed stalks, such as bagasse. The mass of crushed vegetable fibrous material is continuously fed through this zone in the form of a moving mat and is subjected continuously to mechanical beating and to the simultaneous action of the streams of water introduced through the inclined nozzle 25. This action loosens the mat of crushed vegetable fibrous material and causes the pith to settle out and pass through the screen 24 into the discharge outlet 14 for the separated pith. The fibrous material from which the pith has been removed is discharged from the end of this zone passing over the partition 13 into and through the outlet 15.

What is claimed is:

1. A method of separating crushed stalks containing pith and fibrous material into pith and fibrous constituents, which method comprises feeding as a continuous stream a mass of said crushed stalks in a longitudinally extending path, subjecting said mass of crushed stalks during its movement in said path and while the said crushed stalks are in a gaseous medium to mechanical beating to loosen the mass of crushed stalks and place the pith in a readily separable form, continuously screening the loosened material to screen out the pith therefrom while the loosened material is moving through said longitudinally extending path, continuously removing from the terminus of said path the residual fibrous material from which the pith has been screened out and continuously separately removing the pith.

2. A method of separating crushed stalks containing pith and fibrous material into pith and fibrous constituents, which method comprises feeding as a continuous stream a mass of said crushed stalks in a longitudinally extending path, subjecting said mass of crushed stalks during its movement in said path and while in an atmosphere of air to mechanical beating and to the simultaneous action of a stream of liquid to loosen the mass of crushed stalks and place the pith in a readily separable form, continuously screening the loosened material to screen out the pith therefrom while the loosened material is moving through said longitudinally extending path, continuously removing from the terminus of said path the residual fibrous material from which the pith has been screened out and continuously separately removing the pith.

3. A method of separating crushed stalks containing pith and fibrous material into the pith and fibrous constituents, which method comprises feeding over a series of rotating hammers a mass of said crushed stalks in a longitudinally extending path, said hammers beating and agitating the underside of said mass without completely penetrating the entire thickness thereof while simultaneously subjecting said mass of crushed stalks to a stream of liquid, the combined action of said hammers and liquid effecting loosening of the mass of crushed stalks and conditioning of the pith so that it is readily separable from the fibrous material, continuously screening out of the thus treated material the pith while flowing the liquid through said screen to facilitate the separation of the pith from the loosened material, continuously removing the pith thus screened out, and continuously withdrawing the fibrous material from the terminal end of said path, thus effecting a separation of the fibrous material from the pith.

4. The process of separating bagasse into pith and fibrous material, which comprises establishing a rotating beating zone above a screen, which zone is of substantial depth, continuously feeding a mass of bagasse through said zone in the form of a continuously moving mat while subjecting the underside of said mat to the action of the rotating beaters and to the simultaneous action of a stream of liquid thus loosening said mat and conditioning the pith in the bagasse so that it readily separates from the fibrous material, continuously subjecting the loosened material to screening to screen out the pith from the fibrous material, continuously flowing said liquid through said screen to facilitate the separation of said pith from the fibrous material, withdrawing the pith thus separated from the fibrous material, and continuously separately withdrawing the fibrous material.

5. A method of separating crushed stalks containing pith and fibrous material into its pith and fibrous constituents, which method comprises feeding over a series of rotating hammers a mass of said crushed stalks in a longitudinally extending path, said hammers beating and agitating the underside of said mass without completely penetrating the entire thickness thereof while said mass of crushed stalks are in an atmosphere of air, the action of said hammers effecting loosening of the mass of crushed stalks and conditioning the pith so that it is readily separable from the fibrous material, continuously screening out of the thus treated material the pith while passing the fibrous material in a generally longitudinal direction through said path, continuously removing the pith thus screened out, and continuously withdrawing the fibrous material from the terminal end of said path, thus effecting a separation of the fibrous material from the pith.

References Cited in the file of this patent

UNITED STATES PATENTS

| | | |
|---|---|---|
| 811,419 | Manns | Jan. 30, 1906 |
| 853,943 | Drewsen | May 14, 1907 |
| 1,155,741 | Lee | Oct. 5, 1915 |
| 1,785,840 | Munroe | Dec. 23, 1930 |
| 1,847,050 | Williams | Feb. 23, 1932 |
| 1,854,557 | Munroe et al. | Apr. 19, 1932 |